July 14, 1970 E. J. SIFF ET AL 3,520,198
ACCELEROMETER
Filed Jan. 3, 1966 2 Sheets-Sheet 1

INVENTORS
ELLIOTT J. SIFF
IRVING SCHAFFER
BY
ATTORNEYS

INVENTORS
ELLIOTT J. SIFF
IRVING SCHAFFER

ATTORNEYS

United States Patent Office 3,520,198
Patented July 14, 1970

1

3,520,198
ACCELEROMETER
Elliott J. Siff, Bridgeport, and Irving Schaffer, Fairfield, Conn., assignors, by mesne assignments, to Varo Inertial Products, Inc., Garland, Tex., a corporation of Texas
Filed Jan. 3, 1966, Ser. No. 518,291
Int. Cl. G01p 15/08
U.S. Cl. 73—517                                                           8 Claims

ABSTRACT OF THE DISCLOSURE

An accelerometer comprising a support member, a shaft cantilevered from the support member and having a single flexure axis intermediate its ends, an inertial mass supported on the free end of the shaft, and signal means for indicating movement of the free end of the shaft.

This invention relates to accelerometers. It is particularly directed to subminiature linear accelerometers adapted for use in guidance systems such as inertial guidance systems for aircraft, missiles and similar high velocity vehicles.

The accuracy of a guidance system is in part the function of the fidelity of the information fed into the system. Thus, for example, to guide a rocket it is necessary to know the values which relate to the rocket's attitude, its velocity and the changes in these factors. The changes in velocity, namely, acceleration and deceleration, are critical values in such guidance systems. It is the accurate and reliable sensing of linear changes in velocity to which this invention is especially directed.

The accelerometer of this invention is compact and simple in construction yet highly sensitive in performance. Further, by virtue of its novel construction, it may be subject to changes in velocity considerably beyond the range of its output signal capability, as at the initial acceleration shock of a vehicle launch, without impairing its reliability within its designed range.

Broadly, the accelerometer of this invention comprises a support member and a shaft cantilevered from the support member. The shaft has an inner end portion attached to the support member, an outer end portion movable relative to the inner end portion, and an intermediate flexible portion having a flexure axis disposed at right angles to the shaft axis. An inertial mass is supported upon the outer end portion of the shaft and is movable therewith. A signal means, or pick-off, is connected to the outer end portion of the shaft for indicating movement of the outer end portions.

A preferred embodiment of the invention is described below with reference to the accompanying drawings.

Figure 1:
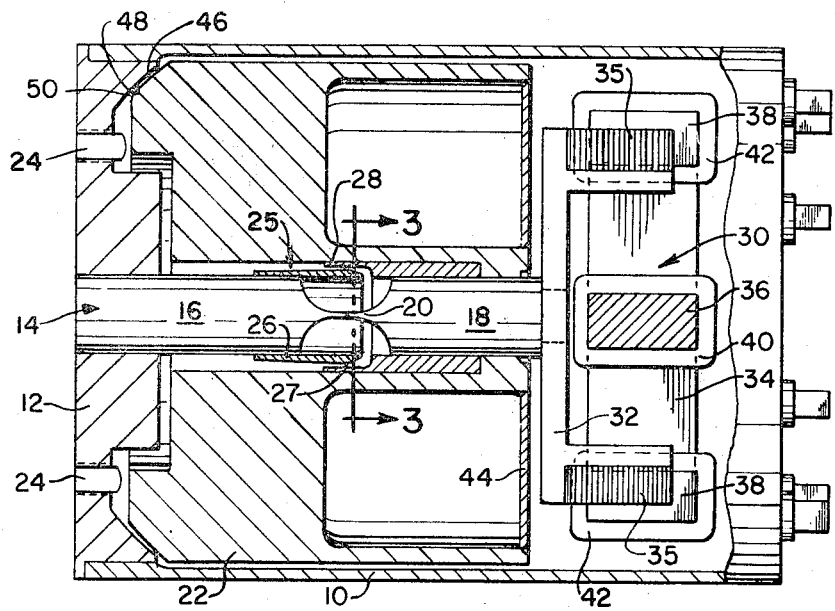
FIG. 1 is a longitudinal section of the accelerometer.

Referring to FIG. 1, the accelerometer comprises a cannister 10 for containing the moving parts of the accelerometer. Secured at one end of the cannister 10 is a support member or plate 12 which supports a shaft 14. The shaft 14 is secured at its inner end portion 16 to the support member 12. Thus, the shaft 14 projects from the support member 12 as a cantilever and has an outer end portion 18 which is free.

2

Figure 3:
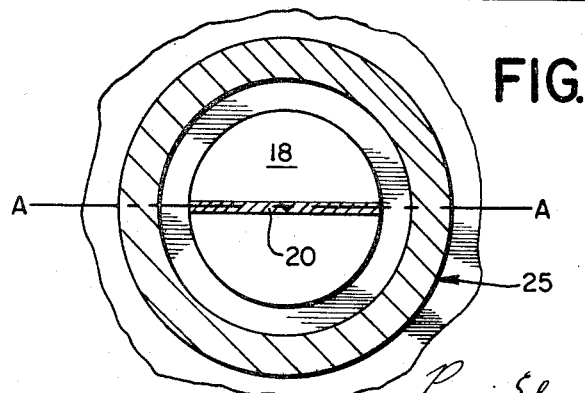
FIG. 3 is a section taken along lines 3—3 of FIG. 1 illustrating the flat necked portion about which the inertial mass rotates.

The shaft 14 is unique in its construction. Intermediate of the inner and outer end portions, 16 and 18, respectively, is a flexible flat necked portion 20. The flat necked portion 20 is defined by rounded slots cut out in opposition to one another across the shaft 14 which is therefore left with a substantially rectangular web-like cross section as shown in FIG. 3. This uniquely narrowed portion 20 of the shaft 14 acts in the nature of a spring tending to maintain the elements of the accelerometer in the null position shown in the drawings yet permitting the outer end portion 18 to be tilted relative to the inner end portion 16 when a bending moment is applied to the outer end portion. The flexing of the shaft 14 and the tilting or rotating of the outer end portion is permitted, however, only about the flexure axis A—A (FIG. 3). The flexure axis A—A represents the single axis about which the outer end portion 18 is rotatable. The flexure axis A—A is contained in the medial plane of the flat necked portion substantially at its narrowest part and is perpendicular to the longitudinal axis of the shaft 14.

Secured to the outer end portion 18, is an inertial mass 22 which moves in response to changes in velocity of the accelerometer along the linear path perpendicular to both the flexure axis A—A and the axis of the shaft 14. The inertial mass 22 is a substantially solid mass having its center of gravity inwardly (to the left as seen in FIG. 1) of the flat necked portion 20.

The movement of the inertial mass 22 in response to acceleration or deceleration forces will be substantially up or down as seen in FIG. 1. Because the mass 22 is secured to the outer end portion 18 only, a movement of the mass will cause the outer end portion 18 to rotate about the flexure axis of the flat necked portion 20. While the outer end portion 18 thus in fact travels through an arc, the degree of rotation is so limited (about one degree) that the movement may be viewed as being substantially linear.

Figure 2:
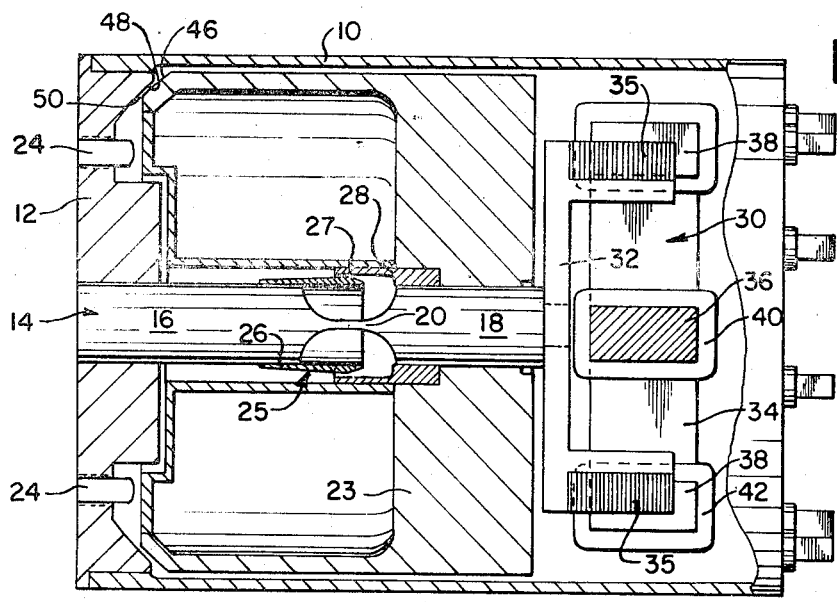
FIG. 2 is another embodiment of the accelerometer of FIG. 1 illustrating an inertial mass having a different center of gravity.

As noted above, the inertial mass is preferably formed with its center of gravity inward of the flat necked portion 20. The inertial mass may have its center of gravity outward of the flat necked portion 20, as is the case in the embodiment of FIG. 2. The embodiment of FIG. 2 is the same as the embodiment of FIG. 1 except for the design of the inertial mass. Therefore, the inertial mass of FIG. 2 will be identified by the numeral 23 and all other identification numbers will be as they are in FIG. 1.

The accelerometer functions to detect linear changes in velocity. Thus, for example, were the accelerometer as seen in FIG. 1 moved upwardly along the line perpendicular to the axis A—A and the axis of the shaft 14 at increasing speed the forces acting upon the inertial mass 22 (which forces may be analyzed as acting at the center of gravity of the mass) would tend to move that mass downwardly. This downward movement of the mass 22 would thereby cause a counter-clockwise rotation or upward movement of the outer end portion 18 about the flexure axis A—A.

Applying the same factual situation to the accelerometer of FIG. 2 the forces acting upon the inertial mass 23 would rotate the outer end portion 18 clockwise or downward because the location of its center of gravity is outward of the flat necked portion 20.

The movement of the inertial mass 22 and 23 is limited by adjustment screws 24 seated in the support member 12. After a predetermined amount of rotation the interior surface of the inertial mass 22 will strike the end of an adjustment screw 24 thus preventing the movement of the accelerometer elements beyond their operable range. Such limits are important to preserve the integrity of the device through acceleration and deceleration conditions which need not be measured. These conditions might exist, for example, at the initial thrust of a missile or at the shock of impact from accidentally dropping the accelerometer.

In addition to these rotational forces acting through the outer end portion 18, there is a shear force acting at the flat necked portion 20 along a vertical line as seen in FIGS. 1 and 2. Under unusually high acceleration or extreme shock loading the shear force could tend to plastically deform (in contrast to elastically flex), the flat necked portion 20 thereby destroying its ability to return to the null position. This possibility of plastic deformation is prevented by a high shock snubber 25 which limits the amount of movement along the vertical as seen in FIGS. 1 and 2.

Figure 5:
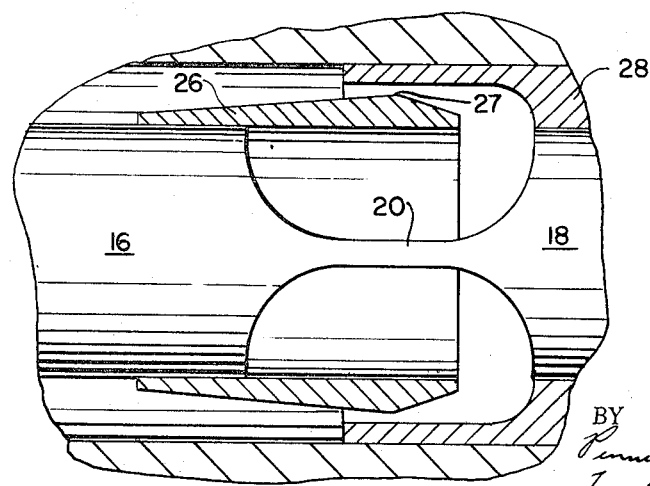
FIG. 5 is a detailed view of the snubber illustrated in FIG. 2.

The snubber 25 is best illustrated in FIG. 5. The snubber 25 comprises an annular flange 26 mounted upon the inner end portion 16 and a collar 28 mounted upon the outer end portion 18. The flange 26 has a greater outside diameter at a maximum diameter portion 27 which is intermediate of the ends of the flange. Thus, the flange 26 is tapered toward both of its ends. The flange 26 is positioned upon the inner end portion 16 such that the plane defined by the peripheral line of the maximum diameter portion 27 substantially contains the flexure axis A—A.

The collar 28 and the annular flange 26 are adapted to be positioned in telescoped relationship with each other, the flange, including the maximum diameter portion 27, fitting within the collar. The flange 26 and collar 28 of the snubber 25 do not interfere with the rotation of the inertial mass 22 within its designed range because of the tapered configuration of the flange 26 which allows space for movement of the collar 28. However, the maximum diameter portion 27 being in substantially the same plane as the flexure axis A—A allows a minimal space for movement of the collar 28 in the vertical as viewed in FIGS. 1 and 2. Thus, the movement of the inertial mass 22 or 23 which generates shear forces at the flat necked portion 20 is restricted.

The movement of the inertial mass 22 or 23 is sensed by a signal means or pick-off 30 connected to the outer end portion 18. The signal means 30 may be any of the well known means for translating a substantially linear movement into an electrical output signal. Preferably, the signal means is of the type disclosed in our co-pending application Ser. No. 475,434 dated July 28, 1965 and assigned to the same assignee. It comprises an armature 32 and a stator 34. The armature 32 has magnetically permeable insets 35. The stator 34 has a primary core member 36 and secondary core members 38, with primary and secondary coils 40 and 42 respectively wound thereon.

While not shown in the drawings a complementary pair of secondary core members also forms part of the stator 34 and is in opposed spaced relation from the secondary core members shown. Thus, the armature 32 is positioned between the four secondary core members 38. The stator 34 is a unitary structure by reason of the primary core member 36 interconnecting the stator elements.

The primary coil 40 is connected to a source of alternating current which, in accordance with well-known principles of magnet induction, generates a magnetic flux in the primary core 36. The magnetic flux radiates through the secondary cores 38 and tends to generate electric potentials in the secondary coils 42. Because the secondary coils 42 are wound at an opposite hand to each other there is no net potential difference when the accelerometer is in the null position. However, when the armature 32 moves within the magnetic field of the stator 34 due to the changes in velocity seen by the accelerometer, an imbalance in the flux is created in the secondary cores 38 because of the changed positions of the magnetically permeable insets 35. This imbalance is reflected as a net potential difference in the secondary coils 42 thereby generating a signal corresponding to the movement of the inertial mass 22 or 23. The signal can then be read as a measure of acceleration or deceleration.

In addition to the foregoing elements, the accelerometer is preferably provided with damping means to minimize oscillations of the inertial mass. Damping is advantageously effected by filling the voids between the exterior surface of the inertial mass 22 or 23 and the interior of the casing 10 and support member 12 with a suitable damping liquid of predetermined viscosity. It is noted here that the inertial mass 22 in the FIG. 1 embodiment has a hollowed portion which is sealed off from the damping liquid by a cap 44.

Greater damping control is obtained by forming an annulus 46 as an integral portion of the inner face of the inertial mass 22 or 23 and providing an opposed annular channel 48 in the support member 12. The annulus 46 and the opposed annular channel 48 cooperate to define an annular gap 50 to restrict the flow of the damping liquid as the inertial mass 22 or 23 moves relative to the support member 12.

Figure 4:
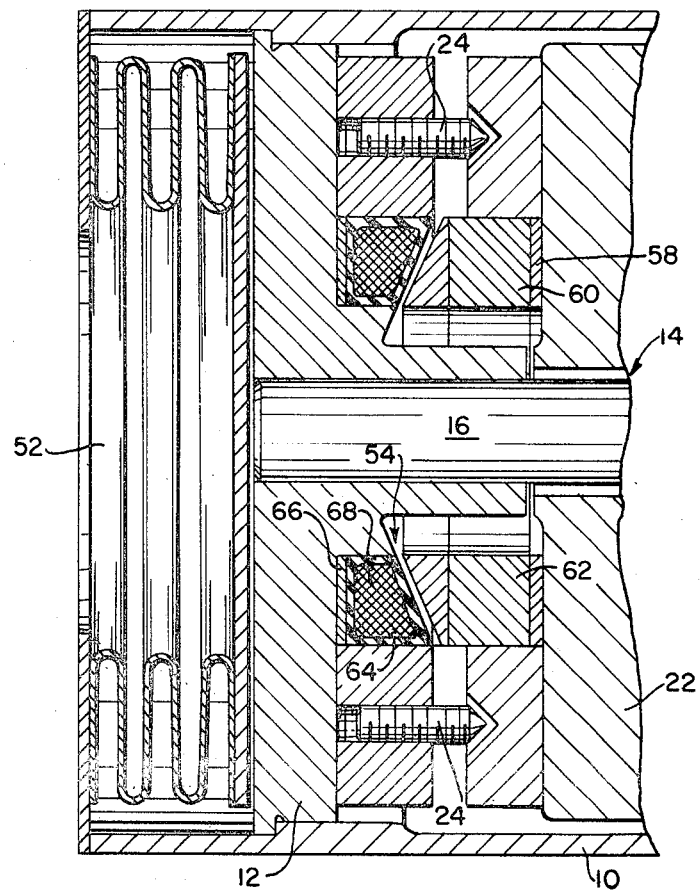
FIG. 4 illustrates a bellows and a torquer means.

Referring to FIG. 4, a bellows 52 and a torquer means 54 are shown. It is understood that the bellows 52 and/or the torquer 54 may be used in connection with either or both of the embodiments of FIGS. 1 and 2 but they will be described with reference particularly to the embodiment of FIG. 1.

As mentioned above, the voids within the outer casing 10 are completely filled by a damping liquid of predetermined viscosity. The damping liquid is introduced within the outer casing through a suitable aperture in the cover plate. The outer surface of the bellows 52 contains the damping liquid within the casing 10 and its inner surface is exposed to atmospheric pressure. Thus, the thermal expansion and contraction of the damping liquid within the casing produces contraction and expansion of the bellows 52 without significant change in the pressure on the fluid. Also, the spring force of the bellows exerts a positive force on the liquid mass to prevent the formation of voids in the damping fluid.

The support plate 12 is formed with a pair of holes 56 through which the damping liquid may pass to the bellows 52.

The torquer 54 may be provided for augmenting the elastic restoring force of the flat necked portion 20. Further, the torquer means 54 may be provided in an embodiment of the invention where the damping means discussed above is not utilized. Such a torquer may serve as a damping means as well as a means for checking the accelerometer readings.

Referring to FIG. 4, the torquer means 54 comprises an annular magnetically permeable return path ring 58 secured to the inertial mass 22 at a position comparable to the placement of the annulus 46 as seen in FIG. 1. Fixed to the return path ring 58 are permanent magnets 60 and 62. These magnets are in diametrically opposed positions on the ring 58 and further oriented so that their opposite poles are adjacent the ring. Thus, as illustrated in FIG. 4, permanent magnet 60 has its south pole adjacent the ring 58 and the permanent magnet 62 has its north pole adjacent the ring. The magnets 60 and 62 are, additionally, located on a line perpendicular to the flexure axis A—A of the flat necked portion 20.

In opposition to the magnets 60 and 62 and to the ring 58 is an electromagnetic coil 64 on the supporting element 12. The electromagnetic coil 64 in turn comprises a magnetically permeable ring 66 and windings 68.

When the coil 68 is energized a magnetic field is established which acts upon the permanent magnets 60 and 62. Because the magnets 60 and 62 have opposite poles facing the electromagnetic coil 68 a torque is applied to the inertial mass 22 tending to tilt it about the flexure axis of flat necked portion 20. The degree of tilting is dependent upon the strength and polarity of the magnetic field created when the electromagnetic coil 68 is energized.

The torquer means so described may advantageously serve several functions. It may be used for checking the output signal of the pick-off means. Thus, the electromagnetic coil 68 may be energized a known amount to cause the inertial mass 22 to tilt to a predetermined degree. The signal from the pick-off means may then be checked to see if it matches with the predetermined value.

The torquer means 54 may also function as a damper. For such purpose the signal from the pick-off means is advantageously utilized to energize the electromagnetic coil 68 in response to the direction and rate of tilting of the inertial mass 22. Accordingly, the electrical signal from the pick-off assembly is suitably amplified by known amplifier means and directed through the coil 68 to establish a magnetic field the polarity and strength of which is proportional to the direction and strength of the rate of change of the net signal from the pick-off. The torque thus applied acts to dampen the movement of the inertial mass 22. Damping may also be accomplished by connecting the terminals of the coil 68. This would cause a force proportional to the rate of movement of the magnets 60 and 62 carried on the inertial mass 22 past the coil 68 and opposing the direction of the motion.

A further refinement of this technique is to use the torquer 54 to substantially restrain the inertial mass 22 against any rotation and to take the measure of the current necessary to prevent rotation as the accelerometer's output signal. Thus, the signal from the pick-off assembly may be amplified by the amplifier means to such an extent that the torquing forces will offset the rotational forces tending to tilt the inertial mass 22. The magnitude of the current applied to the torquer coil 68 to maintain the inertial mass 22 in a balanced condition about the flexure axis will then be a measure of acceleration.

We claim:
1. An accelerometer comprising
   (a) a support member,
   (b) a shaft cantilevered from the support member, the shaft having
      (i) an inner end portion attached to the support member,
      (ii) an outer end portion movable relative to the inner end portion, and
      (iii) an intermediate flexible portion having a flexure axis at right angles to the shaft axis,
   (c) an inertial mass supported upon the outer end portion of the shaft and movable therewith;
   (d) signal means for indicating movement of the outer end portion of the shaft; and
   (e) snubber means mounted upon the shaft to limit the movement of the outer end portion thereof, said snubber means comprising an annular flange mounted upon the inner end portion of the shaft and a collar mounted upon the outer end portion of the shaft in telescoped relationship with said flange.

2. An accelerometer according to claim 1 wherein the intermediate portion of the shaft is a flexible flat necked portion, the flexure axis of the flat necked portion defining a single axis about which the outer end portion is movable.

3. An accelerometer according to claim 2 having stop means for limiting pivoting movement of the outer end portion of said shaft within its designed operating range.

4. An accelerometer according to claim 1 wherein the annular flange has a maximum diameter portion intermediate of its ends disposed in a plane which extends at right angles to the longitudinal axes of said shaft and which includes said flexure axis.

5. An accelerometer according to claim 4 wherein the signal means comprises an armature affixed to the outer end portion of the shaft and a stator for creating the magnetic field within which the armature moves.

6. An accelerometer according to claim 5 having, in addition, damping means for damping the oscillation of the inertial mass.

7. An accelerometer according to claim 6 wherein the center of gravity of the inertial mass is inward of the flexure axis of the flat necked portion.

8. An accelerometer according to claim 6 wherein the damping means is a magnetic torquer.

References Cited
UNITED STATES PATENTS

| | | | |
|---|---|---|---|
| 2,257,996 | 10/1941 | Baker | 33—221 |
| 2,350,103 | 5/1944 | Fanger. | |
| 2,873,536 | 2/1959 | Rieger. | |
| 2,985,021 | 5/1961 | Lewis et al. | 73—517 |
| 3,081,637 | 3/1963 | Gevas | 73—517 |
| 3,077,783 | 2/1963 | Stiles et al. | 73—517 |

JAMES J. GILL, Primary Examiner